O. P. LIEBREICH.
AUTOMATIC STORAGE BATTERY FILLER.
APPLICATION FILED JAN. 17, 1918.
1,304,894.
Patented May 27, 1919.
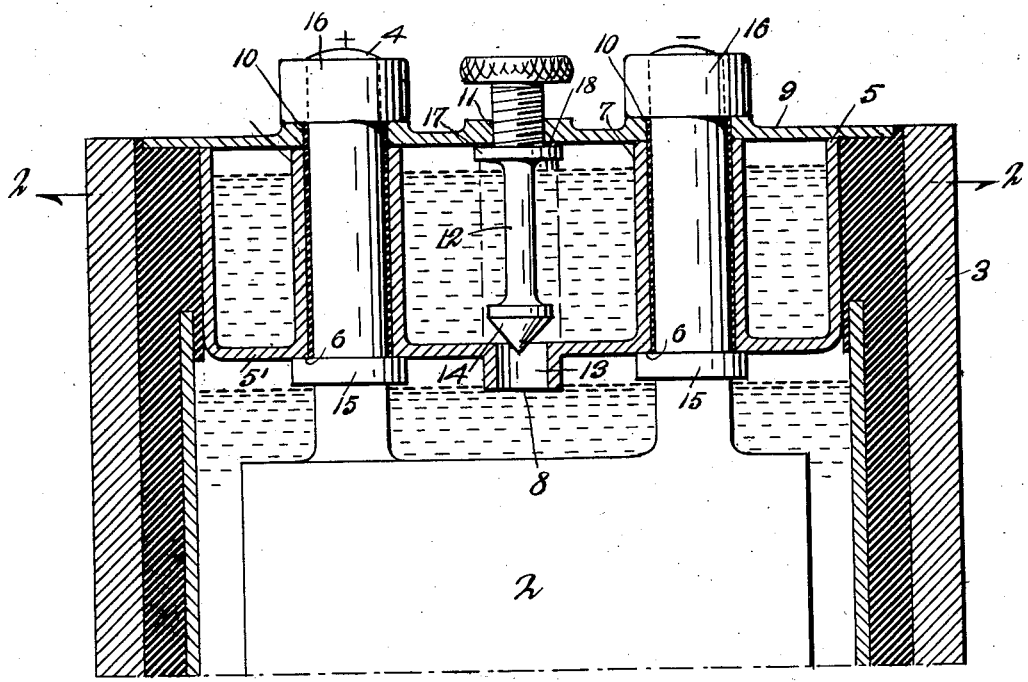
Inventor-
O. P. Liebreich
O. W. Anderson for
Attorneys.

UNITED STATES PATENT OFFICE.

OSCAR P. LIEBREICH, OF TROY, NEW YORK.

AUTOMATIC STORAGE-BATTERY FILLER.

1,304,894.      Specification of Letters Patent.      Patented May 27, 1919.

Application filed January 17, 1918. Serial No. 212,311.

*To all whom it may concern:*

Be it known that I, OSCAR P. LIEBREICH, a citizen of the United States, resident of Troy, in the county of Rensselaer and State of New York, have made a certain new and useful Invention in Automatic Storage-Battery Fillers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to means for automatically supplying storage batteries with water, to make up for the evaporation from the aqueous solution contained in such batteries, and it consists in the novel construction and combinations of parts, as hereinafter set forth.

It is found in practice that, owing to the position of the batteries in an automobile, under the floor of the car, the frequent filling of the batteries needed to supply evaporated water to the solution is difficult and troublesome, the result being that the filling of the batteries is usually neglected or postponed to the last minute, whereby batteries frequently run dry, with consequent injury or disintegration of the plates. The present invention is designed to provide improved means forming a built in part of a storage battery for maintaining a constant level of fluid in the batteries, the supply receptacle holding, for instance, a month's supply of water and lessening greatly the amount of attention required, thereby avoiding injury to the batteries, lessening the repair bills and increasing the life of the batteries. The use of the invention will be valuable to those operating motor cars, electric railways, signal systems, etc., where such batteries are employed.

In the accompanying drawings illustrating the invention, Figure 1 is a vertical section of the invention on the line 1—1, Fig. 2; Fig. 2 is a horizontal section on the line 2—2, Fig. 1, and Fig. 3 is a detail cross section on the line 3—3, Fig. 2.

In these drawings the numeral 2 designates the plates or elements, and 3 the case of a storage cell or battery projecting above said elements, the terminal posts or electrodes 4 of said elements projecting above said case.

Fitting within the case and forming the top thereof is a supply vessel 5, having bottom openings 6, and upwardly projecting sleeves 7 alined with two of said openings and through which said posts extend, a nipple 8 projecting downwardly from the other bottom opening below the level of the fluid in the battery and forming a water seal.

The supply vessel is provided with a top 9 resting upon the top of the case, and having openings 10 through which the terminal posts extend, and a third opening 11 with which a valve rod 12 has threaded engagement, the portion of the bottom of the vessel marginal to the nipple opening being adapted to form a valve seat 13, and said rod having a lower head 14 adapted to engage said seat to close the valve when the supply vessel requires to be filled. The terminal posts are provided with collars 15 which engage the bottom of the supply vessel and maintain the proper degree of separation of the said vessel from the elements or plates of the battery; and with upper collars 16 resting upon the top of the said vessel and from which the elements or plates are suspended.

The valve stem is provided with a collar 17 designed to engage the top of the vessel through a gasket 18, for an air tight joint when the valve is open.

An air vent tube 19, projecting downwardly from the top to the bottom plates, is made integral with the body of the vessel 5, its aperture 20 being continued through the bottom of said vessel. This air vent tube is made of sufficient diameter to enable it to be used also as a filling opening for the battery proper, an opening 21 in the top plate registering with the aperture of the tube.

A filling opening 22 is provided in the top plate, for use in filling the supply vessel, and has a removable cap 23.

I claim:

The combination with a battery having electrodes, a surrounding open-top fluid-containing case projecting above said electrodes, and terminal posts projecting above said case, of a supply vessel located within and forming the top of said case, said vessel having bottom openings, open-top sleeves projecting upwardly from two of said openings, and a depending nipple projecting downwardly from the other opening, below the lever of the fluid in said case to form a water seal, the portion of said bottom marginal to the nipple opening being adapted to form a valve seat, a top for said vessel provided with openings, said posts projecting through two of said openings and being provided with collars resting thereon, and a valve rod having threaded engagement with the other opening of said top and having a lower valve head adapted to engage said valve seat.

In testimony whereof I affix my signature in presence of two witnesses.

OSCAR P. LIEBREICH.

Witnesses:
M. H. JONES,
LOUIS ORLANDO.